(12) United States Patent
Antinori et al.

(10) Patent No.: US 6,290,800 B1
(45) Date of Patent: Sep. 18, 2001

(54) MACHINE FOR AND A METHOD OF MANUFACTURING A LAMINATE PARTICULARLY ADAPTED FOR BEDDING, PADDING, AND UPHOLSTERING

(75) Inventors: Steven Antinori; Manuel Fernandez, both of Tampa; William Harp, Seffner, all of FL (US)

(73) Assignee: Steven J. Antinori, Tampa, FL (US)

( * ) Notice: Subject to any disclaimer, the term of this patent is extended or adjusted under 35 U.S.C. 154(b) by 0 days.

(21) Appl. No.: 09/452,461

(22) Filed: Dec. 2, 1999

(51) Int. Cl.[7] .............................. B32B 31/10; B32B 35/00
(52) U.S. Cl. ........................ 156/276; 156/93; 156/290; 156/291; 156/324; 156/361; 156/383; 156/548; 156/549; 156/555
(58) Field of Search .................................. 156/91, 92, 93, 156/191, 192, 276, 308.4, 324, 269, 290, 291, 209, 361, 383, 459, 494, 510, 538, 543, 548, 555, 390, 70, 301, 495, 547, 549

(56) References Cited

U.S. PATENT DOCUMENTS

| | | |
|---|---|---|
| 354,806 | 12/1886 | Palmer . |
| 413,811 | 10/1889 | Palmer, Jr. . |
| 1,194,254 | 8/1916 | Sumner . |
| 1,456,083 * | 5/1923 | Weiss . |
| 1,553,836 | 9/1925 | Pierce . |
| 1,564,868 | 12/1925 | Lindsay . |
| 1,784,456 | 12/1930 | Ledwinka . |
| 2,538,334 | 1/1951 | Schwartz . |
| 3,183,141 | 5/1965 | Holden et al. . |
| 3,462,007 | 8/1969 | Heider et al. . |
| 3,562,825 | 2/1971 | Larsen . |
| 3,563,837 | 2/1971 | Smith et al. . |
| 3,579,774 | 5/1971 | Shreva . |
| 3,774,250 * | 11/1973 | Miller . |
| 3,873,388 * | 3/1975 | Hunter . |
| 3,894,973 * | 7/1975 | Yunan . |
| 4,432,110 * | 2/1984 | Sutton . |
| 4,504,991 | 3/1985 | Klancnik . |
| 4,619,723 | 10/1986 | Takagi . |
| 4,720,321 | 1/1988 | Smith . |
| 4,748,768 | 6/1988 | Jacobsen . |
| 4,818,324 * | 4/1989 | David . |
| 4,851,069 * | 7/1989 | Packard et al. . |
| 4,862,539 | 9/1989 | Bokich . |
| 4,924,541 | 5/1990 | Inagaki . |
| 5,023,970 | 6/1991 | Tesch . |
| 5,040,473 | 8/1991 | Zesch et al. . |
| 5,061,737 * | 10/1991 | Hudson . |
| 5,317,768 | 6/1994 | Klancnik . |
| 5,389,166 | 2/1995 | White . |
| 5,636,397 | 6/1997 | Boyd et al. . |
| 5,799,600 | 9/1998 | Reuben . |
| 5,974,994 | 11/1999 | Stutznacker et al. . |

FOREIGN PATENT DOCUMENTS

| | | |
|---|---|---|
| 995884 * | 8/1976 | (CA) . |
| 21 23 158 * | 11/1972 | (DE) . |
| 34 13 268 * | 12/1985 | (DE) . |
| 1 300 733 * | 12/1972 | (GB) . |
| 93/07318 * | 4/1993 | (WO) . |

* cited by examiner

Primary Examiner—Curtis Mayes
(74) Attorney, Agent, or Firm—Diller, Ramik, & Wight

(57) ABSTRACT

A method of manufacturing a laminate particularly adapted for bedding, padding upholstering and like applications by feeding an indeterminate length of a first material along a predetermined first path of travel from a source of the first material to a downstream assembly area. Feeding an indeterminate length of second material along a predetermined second path of travel from a source of the second material to the downstream assembly area. Depositing a multiplicity of substantially yieldable cushioning materials upon an upper surface of one of the first and second indeterminate lengths of material during the feeding thereof between the respective sources and the assembly area. Thereafter, sandwiching the cushioning materials between the indeterminate lengths of first and second materials to form a laminate therefrom, and rolling the laminate into a roll. The cushioning materials are foam latex and/or down and the first and second lengths of material are polyester fiber material and/or convoluted foam.

74 Claims, 6 Drawing Sheets

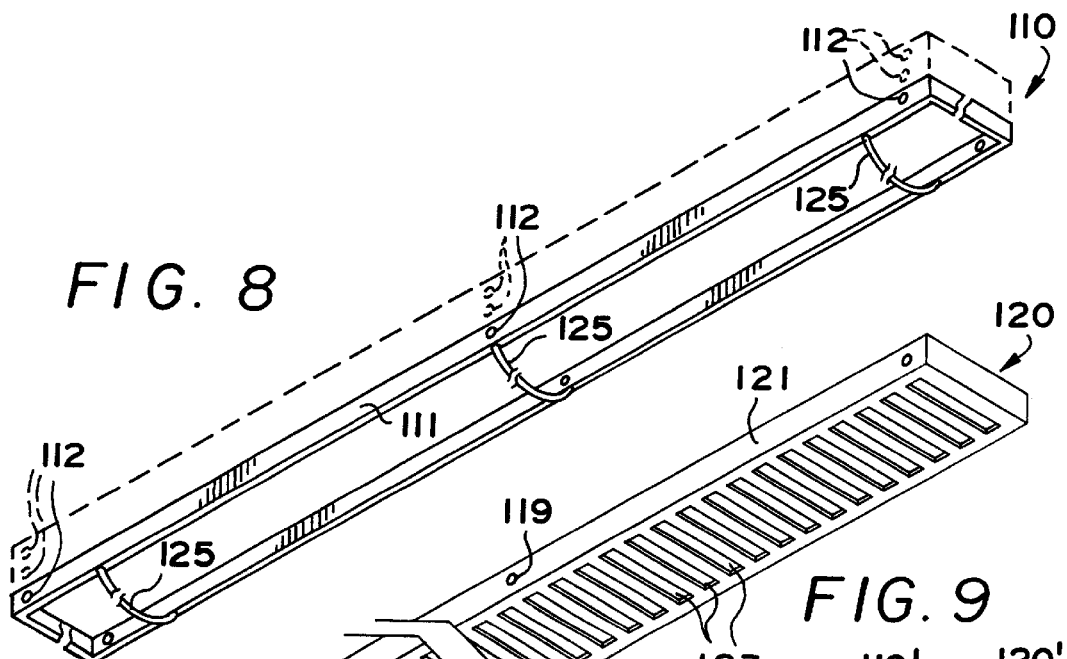
FIG. 8
FIG. 9
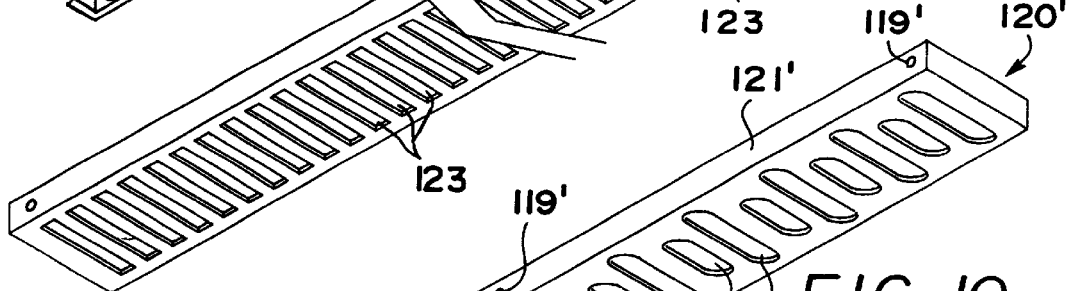
FIG. 10
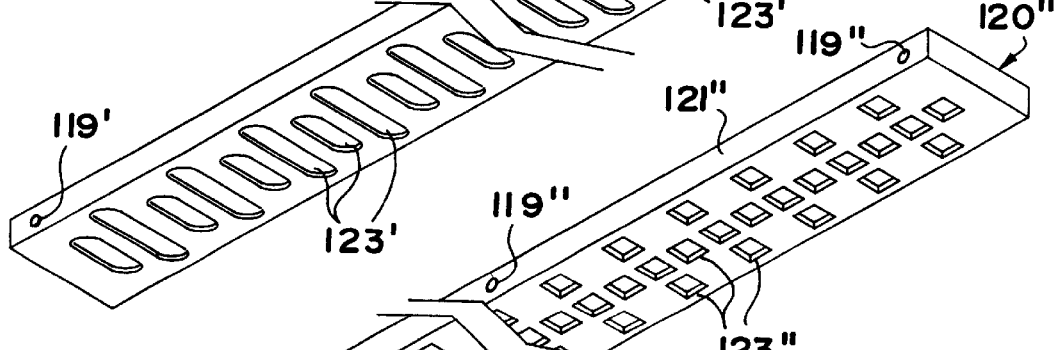
FIG. 11
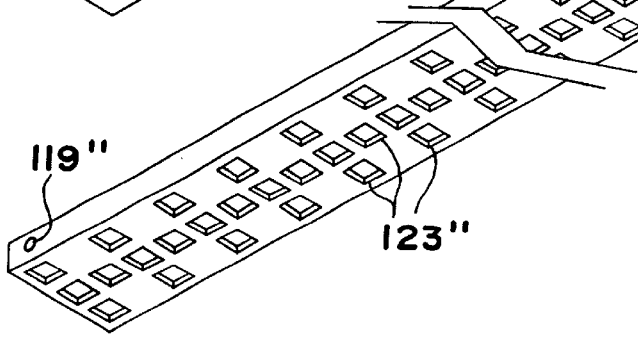

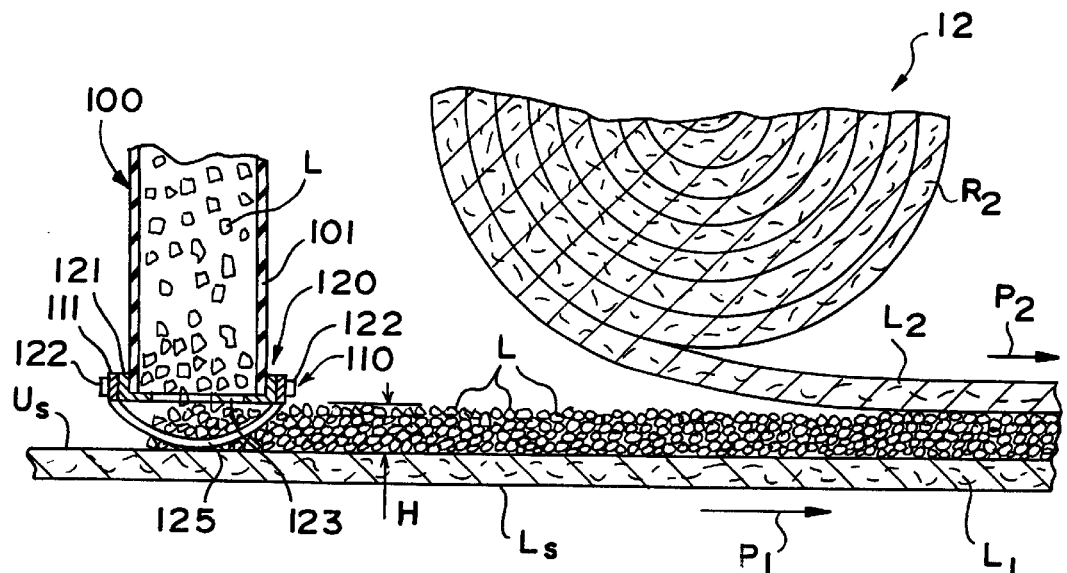
FIG. 12
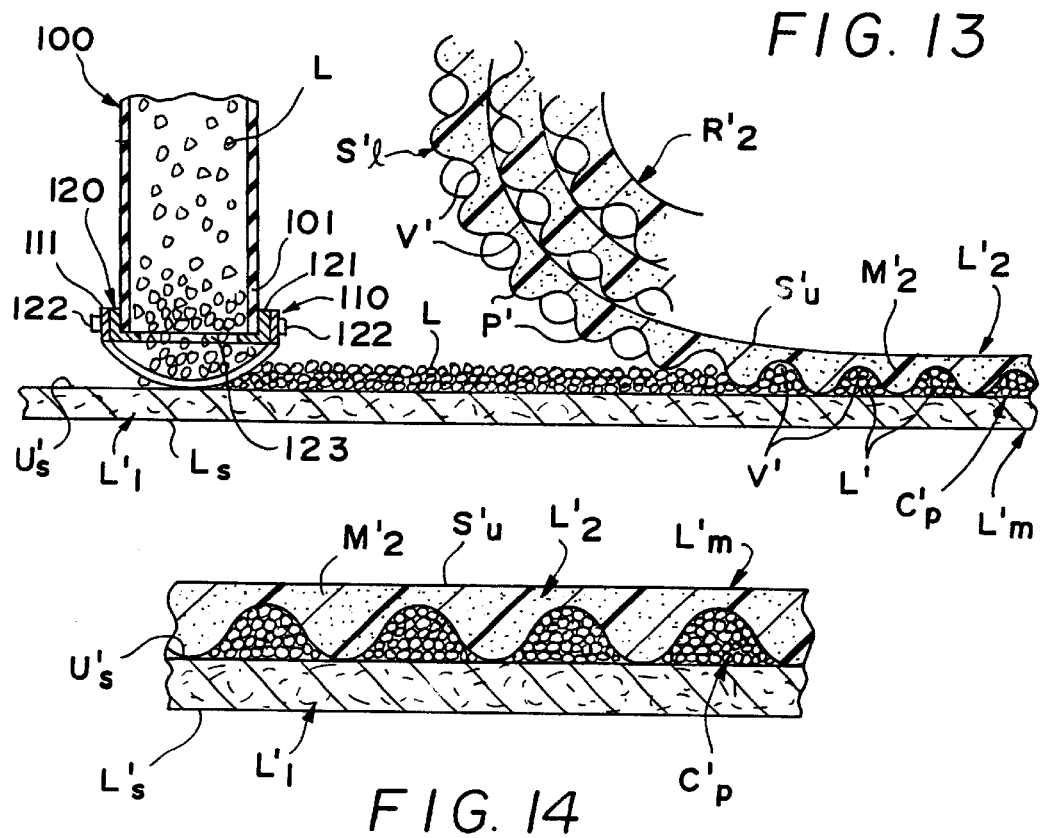
FIG. 13
FIG. 14

MACHINE FOR AND A METHOD OF MANUFACTURING A LAMINATE PARTICULARLY ADAPTED FOR BEDDING, PADDING, AND UPHOLSTERING

BACKGROUND OF THE INVENTION

A mattress normally includes a coil spring unit defined by a plurality of interconnected coil springs which are united to each other and to upper and lower polygonal frame wires which impart a generally rectangular configuration to the coil spring unit. An upper or top mattress pad and a lower or bottom mattress pad, each formed of multiple layers or plies of materials stitched together, and a like narrow peripheral mattress pad, also formed of multiple plies or layers, are assembled to entirely encapsulate the coil spring unit and form the mattress.

The top, bottom and peripheral mattress pads are each formed as a laminate which might, for example, include a backing material layer, a foam material layer, a fiber material layer and a ticking layer, all stitched together by stitching of a conventional "quilt" pattern or design. The materials of the latter layers, the thicknesses thereof, etc. all contribute to such characteristics as softness, breathability, wear, etc. However, irrespective of the particular layers, it is important that the upper mattress pad and the lower mattress pad are manufactured as inexpensively as possible, yet provide the best mattress characteristics possible at the lowest equitable cost over the longest mattress life possible.

A typical conventional mattress corresponding to the mattress just described is disclosed in U.S. Pat. No. 5,317,768 granted on Jun. 7, 1994. The patent discloses a spring component and at least a top surface component formed as a laminate with the outer layer being the ticking or cover fabric, the next inboard layer being a fiber layer, the third layer being a convoluted foam layer, and the innermost fourth layer being a cotton layer with associated stitching holding all four of these layers together to form a quilted multi-ply mattress pad. The thickness of the fiber layer and the thickness of the convoluted foam layer are said to be matters of design choice, though specific examples of weight per square foot of the polyester fiber and the height of the convoluted foam layer are specified as being illustrative. However, it is generally conceded that the best mattresses providing the most comfort are those which include an appreciably thick layer of convoluted foam. However, foam material, particularly latex (natural rubber) foam is extremely expensive and, therefore, appreciably thick convoluted latex foam layers are found most exclusively in higher end, more expensive mattresses. It would be highly desirable to increase the latex foam content in lower end mattresses (less expensive) if costs could be maintained relatively low during the manufacture thereof such that as an end result virtually all qualities of the mattress are appreciably increased at a moderate or low increase in cost at both the wholesale and retail levels.

SUMMARY OF THE INVENTION

In keeping with the foregoing, it is a primary object of the present invention to provide as an end product a novel mattress which includes a conventional coil spring unit and at least a top or upper mattress pad formed of multiple plies or layers including at least one fiber layer and one convoluted foam latex layer having conventional peaks and valleys with the valleys being each substantially filled with a multiplicity of relatively inexpensive, small, random sized, foam latex pieces/materials which might otherwise be discarded as scrap, yet possess all of the highly desirable characteristics of a solid latex foam layer. Since the relatively small pieces of foam latex are entrapped in the valleys during lamination, as will be described more specifically herein, the manufacture of such an upper and/or lower multi-ply mattress pad is relatively inexpensive and, thus, can be utilized to enhance all grades of conventional mattresses now being produced, sold and used throughout the world.

In further accordance with the present invention, such relatively small random sized pieces of latex foam material are also preferably sandwiched between two layers of fiber material, such as conventional polyester fiber, to form an upper mattress pad, a lower mattress pad and/or a peripheral mattress pad formed of three plies, namely, a polyester fiber ply or layer, a layer of latex foam pieces and another polyester fiber ply or layer. As thus far described and as opposed to the first laminated mattress pad herein described, the small individual pieces of latex foam (hereinafter termed "latex") would tend to shift or move when in use as part of a mattress, unless otherwise provided for, as is the case of the present invention in which the two polyester layers are stitched together by a conventional quilting machine which not only secures the layers together as a unit, but the stitching confines or limits the movement or "migration" of the latex when used, for example, as the upper and/or lower mattress pads of a mattress. Thus, conventional stitching of the quilting process not only functions to maintain the two polyester fiber layers (or any other additional layers) united, but the stitching additionally precludes undesired latex migration/shifting which essentially maintains uniform latex thickness and results in a very comfortable yet inexpensive mattress available at low and moderate prices while providing moderate to high quality comfort and softness absent localized "hard" spots, as might otherwise occur with undesired latex migration.

In keeping with the foregoing, the last described mattress pad is formed by a, novel laminating machine of the present invention which provides respective first and second means for rotatably supporting first and second rolls of polyester fiber material with an upper surface of a layer or web of the first roll being fed beneath a trough from which latex/latex pieces are fed. Downstream of the trough a second layer or web of the second roll of polyester fiber material is overlayed upon the pieces of latex at an assembly area during the continuous travel of the polyester fiber layers toward a roll forming or winding station. The thus formed laminate (polyester fiber layer/latex pieces/polyester fiber layer) are then preferably wound into a roll of laminate/laminate roll, the laminate is cut upstream of the roll, and the laminate roll is packaged and shipped to a mattress manufacturer for utilization in the manufacture of a mattress as described earlier herein. An area is provided for storing packaging material, such as a roll of transparent polymeric/copolymeric packaging material, adjacent the roll forming station to use as the packaging material for the laminate roll. Obviously, the diameter of the laminate roll and its length will vary dependent upon the thicknesses of the polyester fiber layers and the amount of latex sandwiched therebetween. No matter the length, width or diameter of the laminate roll, preferably a flying shear or flying cutter severs the laminate normal to the direction of travel in response to automated or manual controls immediately upon completion of the roll packaging operation.

Immediately upon effecting lamination at the lamination or assembly area, the longitudinal edges of the polyester fiber layers are subject to an edge-binding operation which is preferably achieved through spraying a fast drying adhesive therealong which virtually dries instantaneously under normal temperature ranges found in factories, but heaters may be used, as necessary. The adhesive thus sprayed along the longitudinal edges binds all edge-exposed latex pieces to each other and to the polyester fiber layers. Alternatively or additionally, compression edge rollers can be utilized downstream of the adhesive spray applicators, preferably spray guns, to bring the polyester layers into intimate adhesive bonding contact, thereby further assuring that the latex/latex pieces cannot escape the laminate.

In lieu of immediately forming the laminate into a roll, cutting the laminate, packaging the laminate roll and shipping the same to an end user, the laminate may be fed directly into a quilting machine and conventionally quilted or stitched to not only provide unification of the layers and the attendant conventional "quilted" appearance of mattresses, but to also prevent latex "migration." Conventional quilting machines have multiple programmable stitching heads and in accordance with the present invention, such stitching heads are programmed not only to provide an aesthetic quilt appearance, but to also create essentially a multiplicity of relatively small "closed" pockets between the polyester fiber layers defined by the threads of the stitching with the threads or stitching of each "pocket" confining the latex therein and substantially preventing latex migration outwardly of each stitched pocket. The simplest example of the latter is stitching the laminate prior to rolling or immediately upon being unrolled at a mattress fabricator by closely spaced rows of stitching normal and parallel to the direction of travel of the laminate (rolling direction of the laminate roll) to form substantially square or polygonal "closed" pockets, each being relatively "closed" by the stitching associated therewith. Though such "closed" pockets of stitching are desirable, the stitching need not define completely "closed" pockets, but the stitching instead might be configured such as to prevent excessive migration as, for example, closely adjacent parallel sinusoidal stitching either lengthwise or widthwise of the laminate which forms narrow sinusoidal channels which essentially prevent latex migration by the very curved nature thereof and the relatively narrow width of each channel.

The trough which houses the latex preferably includes a tubular polygonal rubber chute carrying at a lower end a latex proportioning gate having a plurality of proportioning openings therein through which pass the latex for deposit upon the upper surface of the polyester fiber layer being conveyed therebeneath. The openings in the gate or plate vary in number, size, shape and orientation depending upon the range of sizes of the particles of the latex being fed therethrough, the amount of latex which is to be deposited per square foot/yard (and thus the eventual height thereof) upon the upper surface of the underlying polyester fiber layer, the speed of production, etc. Gates varying in opening numbers, sizes, shapes and configurations are provided in accordance with the invention for selective utilization to manufacture virtually any and all end product characteristics, such as latex height, density, etc.

The rubber chute or the gate also carries spacers which engage the upper surface of the polyester fiber layer passing therebeneath and assures that this upper surface is spaced at all times a minimum distance from the gate/plate openings. The minimum distance corresponds to the maximum height of the layer of latex which is to be applied to the underlying polyester fiber layer. Since the underlying polyester fiber layer is in continuous motion as it is conveyed toward the assembly/laminating area, its inherent resilience evokes up-and-down movement during the conveyance thereof which, if excessive in an upward direction, will cause the upper surface of the polyester fiber layer to move undesirably closer to the gate openings resulting in the height of the latex being lessened and lessened appreciably beyond that desired. Thus, by maintaining the gate openings at a predetermined minimum distance from the upper surface of the underlying polyester fiber layer during its movement, the thickness/height of the latex is at all times maintained at a uniform desired maximum height which in turn results in a laminate of uniform cross-sectional thickness throughout.

The trough also includes a pair of trough plates, one fixed and another which is adjustable, and between the two trough plates is a vane feed roll or roller which can be rotated at different speeds dependent upon the desired rate of feed of the latex. Lower edges of the trough plates define a transverse slot which can be increased in size by moving the edge of the movable trough plate away from the fixed trough plate and decreased in size by opposite motion for varying the rate of feed of the latex in conjunction with the speed of rotation of the vane feed roll or vane feeder.

The laminating machine also includes a drive mechanism for the take-up roll or roll forming mechanism which is variably adjustable in rotational speed while shafts supporting the rolls of polyester fiber layers or webs are under constant tension of a conventional adjustable brake mechanism. The tension is relatively slight but sufficient to maintain the upper surface of the polyester fiber layer passing beneath the trough relatively horizontally disposed to prevent vertical motion and/or bowing during travel, and thereby assures maximum uniformity of the height of the latex deposited thereupon. Thus, by manually or automatically adjusting the speed of rotation of the shaft upon which the laminate is being wound to form the laminate roll, the amount of latex being deposited upon the upper surface of the underlying polyester fiber layer can be further regulated in conjunction with the earlier mentioned adjustable trough plate, adjustable vane feeder, and different proportioning gates.

The laminating machine can also be utilized to form a multi-ply or laminated mattress pad defined by a convoluted latex foam layer having a relatively flat surface and an opposite surface defining peaks and valleys, latex particles housed within the valleys, and a polyester fiber layer. The latter-described mattress pad is manufactured by the laminating machine in the manner just described with the exception that the downstream roll of polyester fiber material is not utilized, and in lieu thereof a roll of convoluted latex foam is supported upon an associated shaft and is drawn therefrom with its peaks and valleys respectively pointing toward and opening toward the upper surface of the underlying polyester fiber layer. In this fashion as the latex particles deposited upon the upper surface of the lower polyester fiber layer pass beneath and are united with the convoluted latex foam layer, the latex particles are entrapped/encapsulated within the valleys or "pockets" of the convoluted latex foam layer. The laminate thus formed is rolled into a laminate roll and/or stitched by a conventional quilting machine, though the quilt pattern need not provide stitching "pockets," as in the case of the polyester fiber layer/foam latex particles/polyester fiber layer laminate, because the valleys are the "pockets" and prevent latex migration.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 8 is a bottom perspective view of a spacer assembly, and illustrates a spacer frame carrying three convex spacer rods.

FIG. 9 is a bottom perspective view of a proportional feed gate or feed plate, and illustrates a plurality of substantially identically shaped rectangular openings thereof.

FIG. 10 is a fragmentary bottom perspective view of another proportional feed gate or feed plate, and illustrates openings of two different sizes formed therein.

FIG. 11 is a bottom perspective view of another proportional feed gate or feed plate, and illustrates a further group of feed openings formed therein.

FIG. 12 is a fragmentary longitudinal cross-sectional view taken generally, along line 12—12 of FIG. 1, and illustrates the proportional feed gate of FIG. 9 and the spacer assembly of FIG. 8 removably secured to a lower terminal edge of the rubber chute with the convex spacer rods touching an upper surface of the underlying polyester fiber layer.

FIG. 13 is a fragmentary longitudinal cross-sectional view similar to FIG. 12, and illustrates a roll of convoluted foam latex in lieu of the downstream roll of polyester material of FIG. 12.

FIG. 14 is an enlarged fragmentary longitudinal cross-sectional view of the lamination of FIG. 13, and illustrates a multiplicity of randomly sized latex particles/pieces substantially filling downwardly opening valleys or pockets of the convoluted latex foam layer.

FIG. 7, is a fragmentary top perspective view of a modification of the lamination machine of FIG. 1, and illustrates the polyester fiber layer/latex foam pieces/polyester fiber layer laminate being fed into a conventional quilting machine and both transverse and longitudinal sinusoidal stitching forming substantially closed pockets to prevent latex migration.

DESCRIPTION OF THE PREFERRED EMBODIMENTS

Figure 1:
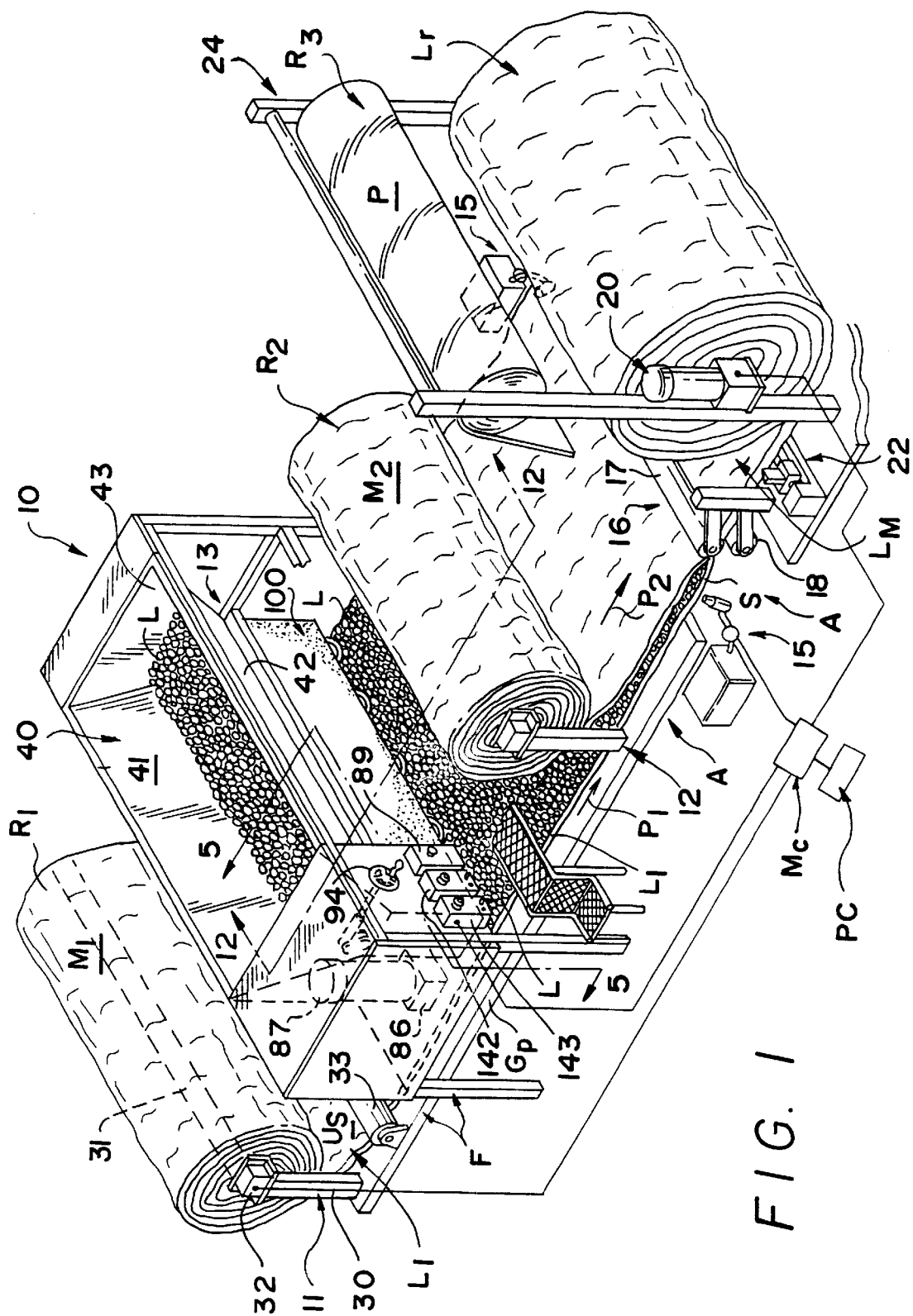
FIG. 1 is a perspective view of a novel laminating machine constructed in accordance with this invention, and illustrates foam latex particles being deposited upon an upper surface of a polyester fiber layer or web being drawn from a roll, and another polyester fiber layer being applied thereto forming a laminate which is formed into a laminate roll and is packaged for delivery to a mattress manufacturer.

A novel machine for manufacturing a laminate particularly adapted for use in bedding (mattresses), padding, upholstering and like applications is fully illustrated in FIG. 1 of the drawings and is generally designated by the reference numeral 10.

The laminate manufacturing machine or laminating machine 10 includes first means 11 for feeding an indeterminate length or layer L1 of first material M1, such as polyester fiber, from a roll R1 thereof along a first predetermined path of travel P1 (FIGS. 1 and 12) which is from left-to-right in each of the two latter figures toward a downstream assembly or laminating area A (FIG. 1).

Second means 12 are provided for feeding another indeterminate length or layer L2 of second material M2 of polyester fiber from a roll R2 along a predetermined second path of travel P2 (FIG. 1). The paths of travel P1, P2 are for the most part substantially in the same direction and are substantially horizontally disposed.

Means 13 are provided for depositing a multiplicity of substantially yieldable cushioning materials L, such as pieces of foam latex of random sizes, upon an upper surface Us of the polyester fiber layer L1 of a predetermined height H (FIG. 12) in a manner to be described more fully hereinafter. The pieces of foam latex L are deposited upon the upper surface Us of the polyester fiber layer L1 upstream of the roll R2 of the polyester fiber layer L2, as is evident from FIGS. 1 and 12 of the drawings. The latex L is deposited upon the upper surface Us of the polyester fiber layer L1 in varying amounts depending upon such factors as the quality of the latex L, whether the mattress to be formed therefrom will be low, moderate or high priced, etc., but for the most part the latex L deposited upon the layer L1 will range between 0.15–0.30 pound per square yard of the layer L1. The range can, of course, be lessened for less expensive end product production and increased for higher priced end products, as, for example, the deposited latex L might be between 0.10–0.50 pounds per square yard. Latex and down, admixed 50%/50% can also be used as the layer L in the preferable range of 0.15–0.30 pound per square yard and up to the broader 0.10–0.50 pound per square yard range.

Means 15 in the form of identical adhesive spraying mechanisms are located an along opposite longitudinal edges (unnumbered) of the layers L1, L2 and the eventually formed laminate Lm which direct an adhesive spray S therealong to edge-bind/edge-bond the longitudinal edges of the layers L1, L2 to each other.

Means 16 in the form of an upper roller 17 and a lower roller 18 temporarily compress the laminate Lm during the passage therebetween to effectively close the longitudinal edges of the layers L1, L2 and preclude the latex L from being dislodged outwardly of the layers L1, L2.

Means 20 are provided for rolling the laminate Lm into a laminate roll Lr.

When the laminate roll Lr is of a desired size, an operator or an appropriate conventional microcontroller Mc, such as Motorolla microcontroller C68HC05J2P, which contains a variety of input/output pins that are programmable to effect a multiplicity of functions including that of appropriately controlling cutting means 22, such as a conventional flying shear or flying cutter, which cuts the laminate Lm normal to the direction P1, P2 thereby freeing the laminate roll Lr for subsequent packaging and shipment.

Means 24 support a roll R3 of packaging material, such as a roll of polyethylene P, above the roll of laminate Lr. The polyethylene material P is simply drawn from the roll R3, wound about the roll of laminate Lr, severed from the roll R3, and appropriate edge-to-edge sealed to encase, protect, and package the laminate roll Lr therein for subsequent shipping to a mattress manufacturer or the like.

The first feeding means or first feeding mechanism 11 includes opposite uprights 30 of which only one is illustrated in FIG. 1 and between which is rotatably supported a shaft 31 which is in intimate frictional engagement with the innermost convolution of the roll R1. A conventional adjustable brake 32 can be adjusted by a worker or by the microcontroller Mc to maintain desired drag on the layer L1 as it is drawn from the roll R1 by the roll forming mechanism 20 in a manner to be described more fully hereinafter. The brake or brake means 32, no matter the specifics of the construction thereof, is relatively conventional and is designed simply to assure that sufficient pull or tension is applied to the layer L1 to maintain the same substantially horizontal with little bow therein during movement along the path P1. The tension is augmented by a top roller 33 spring biased downwardly which spans the width of the layer L1, the purpose of which is to take-up any minute "slack" which might otherwise occur in the layer L1 during its movement along the path of travel P1.

The lower layer L1 is preferably freely fed absent lower support from the point of take-off from the roll R1 until it enters between the rollers 17, 18. However, a lower surface Ls (FIG. 12) of the layer L1 may be supported upon an upper surface (unnumbered) of a relatively smooth glide plate Gp formed of material having an extremely low co-efficient of friction or coated with such material, such as synthetic fluorine-containing resins (Teflon®). In lieu of the guide plate Gp, a plurality of transverse conveyor rollers (not shown) may be utilized to assure that the upper surface Us of the layer L1 is at a fixed height during the passage thereof through the foam latex depositing means 13.

Figure 5:
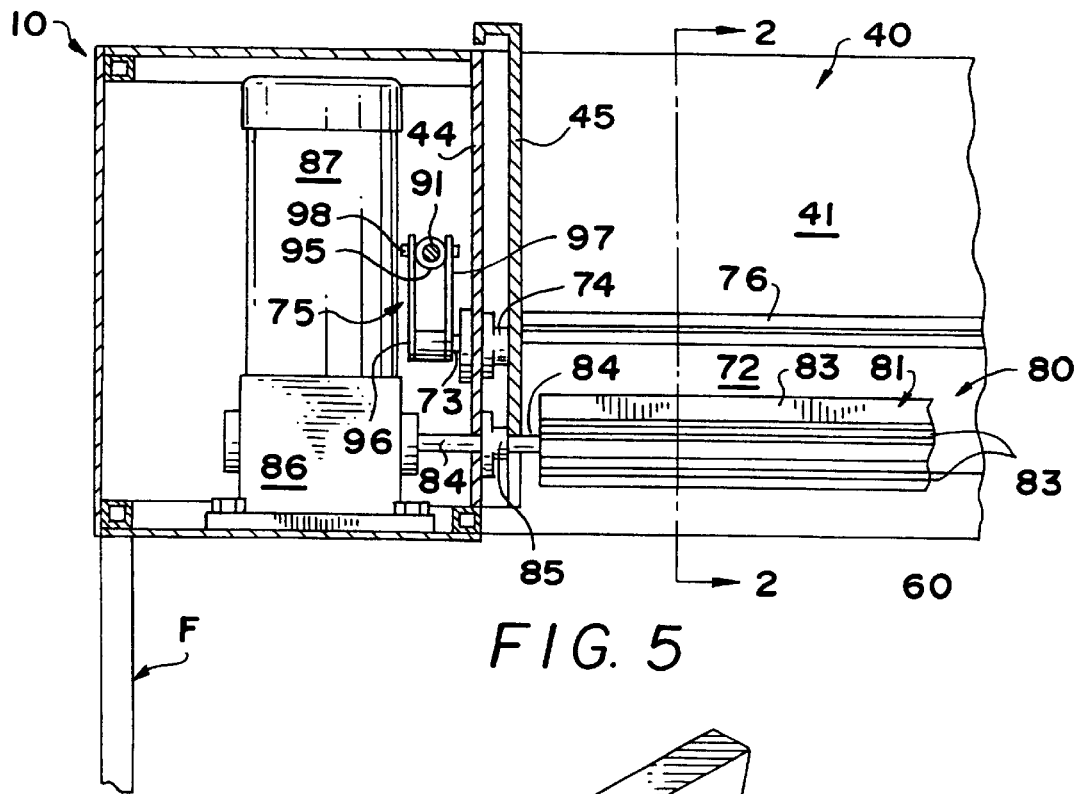
FIG. 5 is an enlarged fragmentary cross-sectional view taken generally along line 5—5 of FIG. 1, and illustrates a drive for the vane feeder and a portion of a linkage for varying the adjusted position of the movable trough plate.
Figure 6:
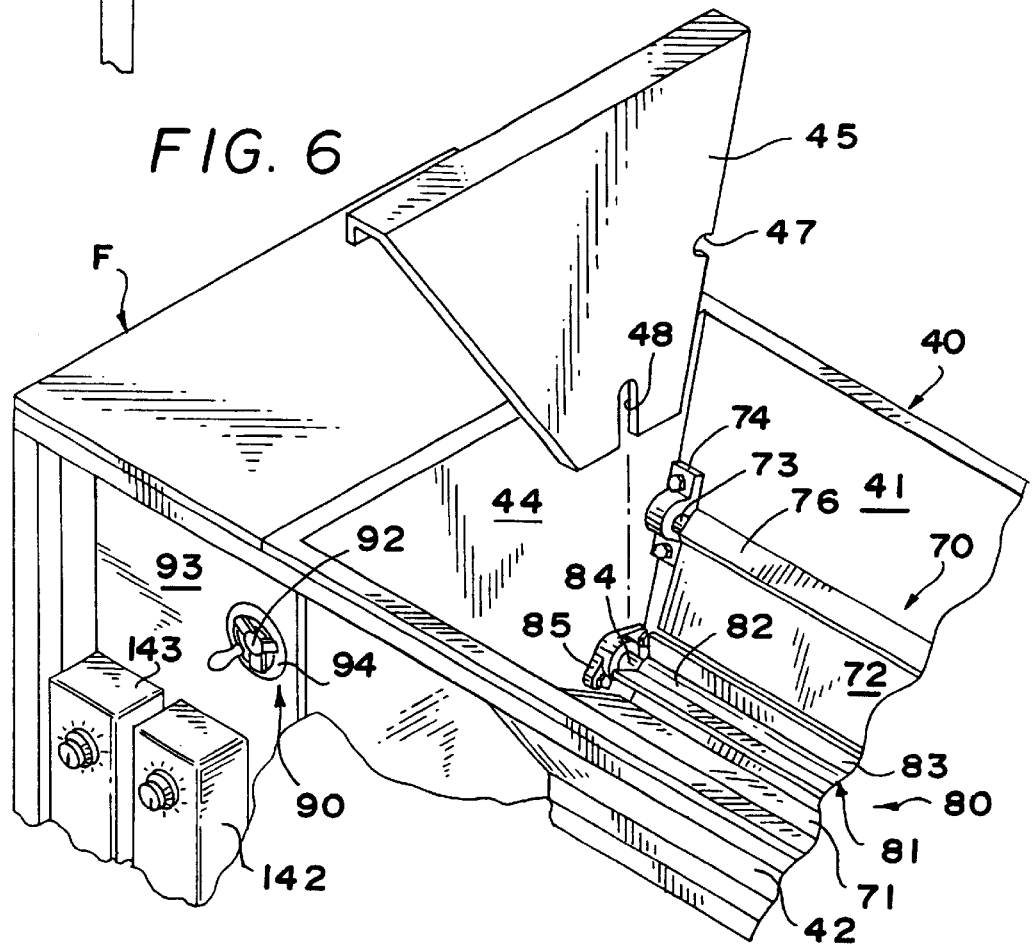
FIG. 6 is a fragmentary top perspective view looking downwardly into the trough, and illustrates a removable trough end plate partially removed to provide access to journals and bearings associated with the movable trough plate and the vane feeder.

The latex depositing means 13 includes a trough 40 conventionally supported by a frame F in transversely spanning relationship to the layer L1. The trough 40 is defined by an upstream wall 41 and a downstream wall 42 which converge relative to each other in a downward direction. The walls 41 and 42 are welded to a side wall 43 and opposite thereto the walls 41, 42 are similarly welded to an outboard opposite side wall 44 (FIGS. 5 and 6). A removable inboard side wall 45 (FIGS. 5 and 6), when seated in its operative position (FIG. 5), covers and protects housings and bearings of linkages and shafts to be described more fully hereinafter. This protects the housings, bearings and shafts, yet provides ready access thereto for repair or replacement by simply gripping and pulling the removable inboard side wall 45 upwardly from the position shown in FIG. 5 to that shown in FIG. 6.

Lowermost terminal edge portions 51, 52 (FIG. 2) of the converging walls 41, 42, respectively, are generally in parallel relationship to each other, and these collectively define with lower edge portions (unnumbered) of the end walls 43, 45 a transverse opening 60 above and extending entirely across the layer L1 as it passes therebeneath.

Housed within the trough 40 and extending substantially the entire length of the transverse opening 60 are means 70 for cooperatively adjustably varying the size of the transverse opening 60 and between which is located rotatable feed means 80 for regulating the passage of the latex L through the transverse opening 60.

Figure 2:
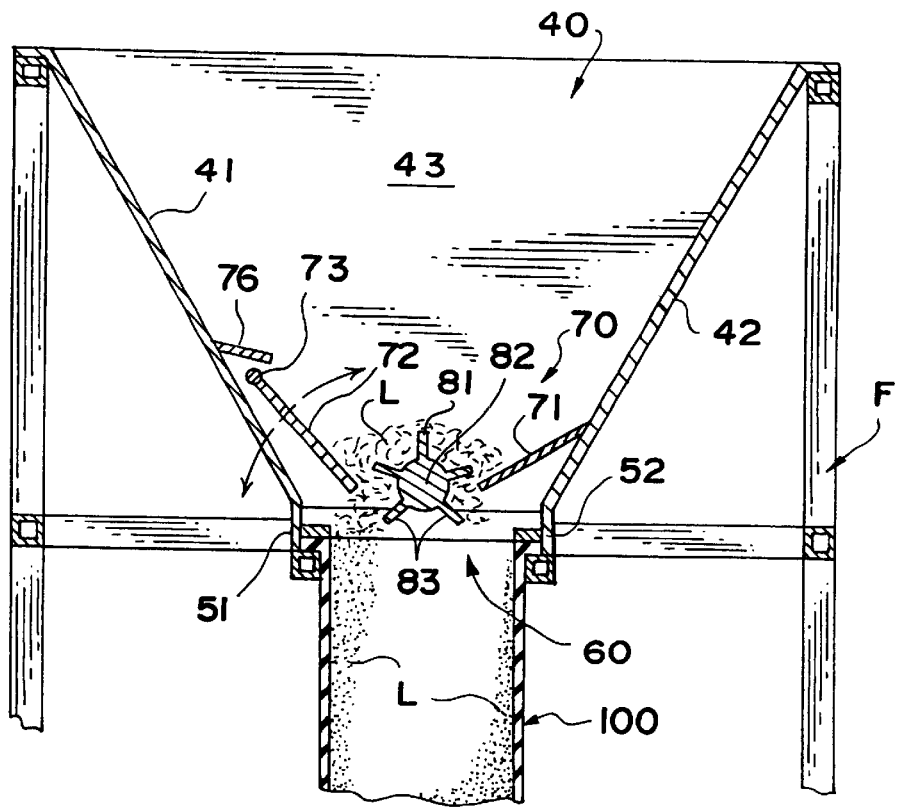
FIG. 2 is an enlarged cross-sectional view taken generally along line 2—2 of FIG. 5 through a trough which houses the foam latex particles, and illustrates a fixed and a movable trough plate, a vane feeder, and a rubber chute through which the foam latex pieces moves incident to being deposited upon an upper surface of the polyester fiber layer passing beneath the trough.
Figure 7:
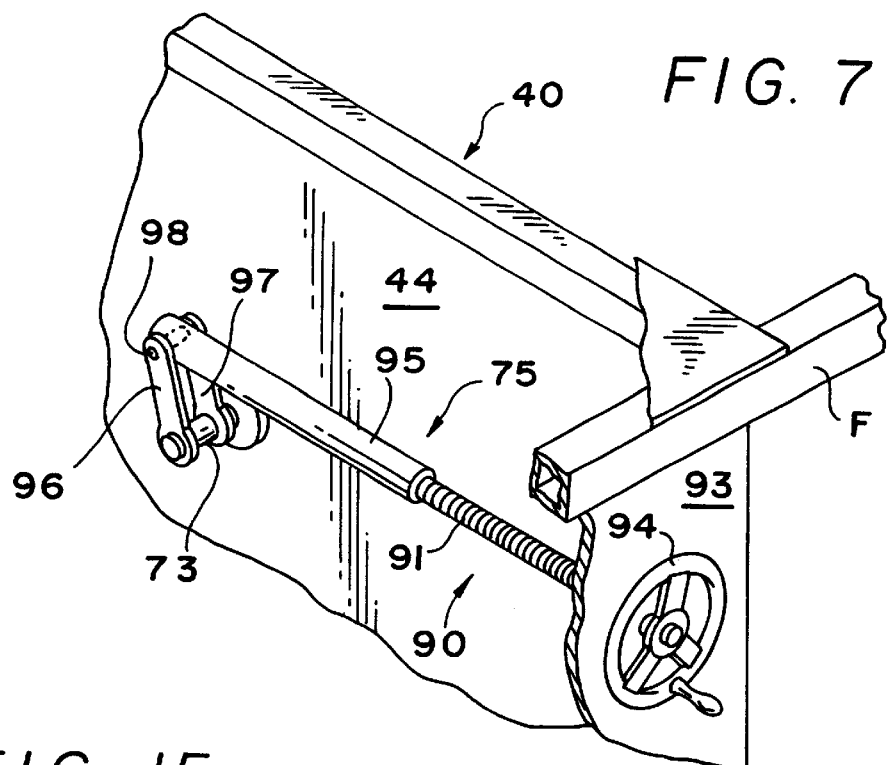
FIG. 7 is a fragmentary top perspective view of the left side of the trough, as viewed in FIG. 1, and illustrates a handle and a screw thread received in an internally threaded sleeve of the linkage for adjusting the position of the movable trough plate.

The opening size adjusting means 70 include a fixed trough plate 71 and a movable trough plate 72 (FIGS. 2, 5 and 6). The fixed trough plate 71 is welded along its entire length to the downstream wall 42 and to the side wall 43, but not to the removable inboard side wall 45. The movable trough plate 72 is welded along its entire length to a shaft 73 which at the end adjacent the removable inboard side wall 45 passes through a slot 47 thereof (FIG. 6). The shaft 43 passes through a bearing (not shown) of a bearing housing 74 (FIG. 6) and passes through an opening (not shown) in the outboard wall 44 (FIG. 7) beyond which it is connected to a linkage 75 (FIG. 7). The opposite end of the shaft 73 is received in a bearing and a housing corresponding to the housing 74 mounted adjacent the side wall 43 (not shown). The trough plate 72 can thereby pivot selectively and adjustably relative to the fixed trough plate 71 and the rotatable feed means 80 in the manner diagrammatically depicted in FIGS. 3 and 4 of the drawings to thereby vary the size of the transverse opening 60 to selectively vary the rate of feed of the latex L therethrough under any one particular speed of rotation of the rotatable feed means 80. In other words, though the rotatable feed means 80 can be varied in its rotational speed, changes in the amount of latex L discharged through the transverse opening 60 can be altered by merely pivoting and changing the position of the pivotable trough plate 72 relative to the rotating feed means 80 and the fixed trough plate 71.

Figure 3:
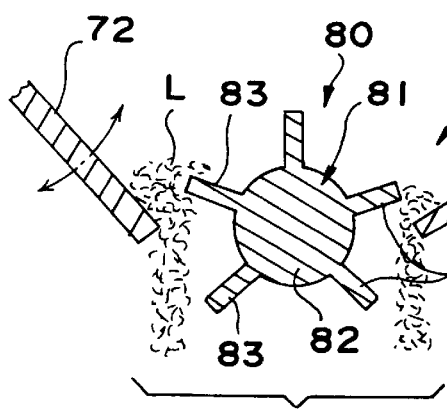
FIG. 3 is an enlarged fragmentary cross-sectional view of the movable and fixed trough plates and the vane feeder therebetween, and illustrates one of many different relative positions to achieve desired latex feed therethrough.
Figure 4:
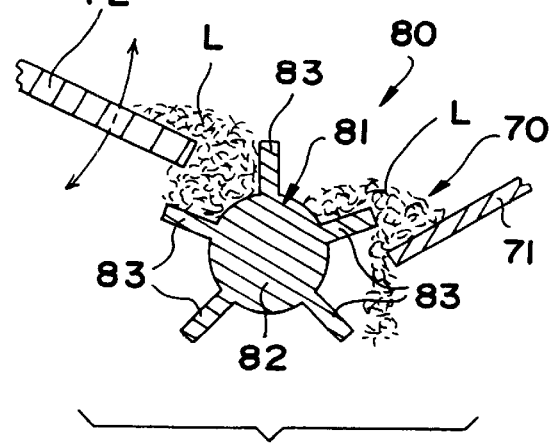
FIG. 4 is a fragmentary enlarged perspective view similar to FIG. 3, and illustrates another relative position of the fixed and movable trough plates and the vane feeder which alters the relative size of the transverse slot, as compared to FIG. 3, and thereby varies the rate of latex feed.

The means or mechanism for varying the position of the trough plate 72 includes trough plate adjusting means 90 (FIG. 7) in the form of a threaded screw 91 having an unthreaded end 92 journalled for rotation in a bearing (not shown) fixed to a housing wall 93 and carrying a handle 94. An internally threaded sleeve 95 forms part of the linkage mechanism 75 (FIGS. 5 and 7) and threadably receives therein the threaded shaft 91. Links 96, 97 (FIG. 7) are pivotally connected to the sleeve 95 by a pivot pin 98 while opposite ends of the links 96, 97 have fixed thereto the shaft 73, as by welding, of the trough plate 72. As is readily apparent from FIG. 7 of the drawings, as the handle 94 of the trough plate adjusting means 90 is rotated in either of two directions, the threaded shaft 91 will thread into or out of the sleeve 95 to pivot the links 96, 97 which in turn rotate the shaft 73 which in turn pivots the movable or pivotable trough plate 72 to achieve the selected variation in size of the transverse opening 60 (FIGS. 2 through 4).

The rotatable feed means 80, which also regulates the passage of the pieces of latex L through the transverse opening 60 through selected speeds of rotation, is defined by a rotatable vane feeder 81 having a central cylindrical portion 82 and five equally arcuately spaced radially outwardly directed vanes 83 projecting therefrom. The cylindrical central portion 82 is reduced in size at opposite end portions, and one such end portion 84 is illustrated in FIGS. 5 and 6 of the drawings projecting through a downwardly opening slot 48 of the removable inboard side wall 45 and being journalled for rotation in a bearing of a bearing housing 85 (FIG. 5) bolted to the outboard side wall 44. A bearing housing (not shown) corresponding to the bearing housing 85 secures the opposite reduced end (not shown) of the cylindrical portion 82 of the rotatable vane feeder 81 to the side wall 43. The end portion 84 projects through an opening (unnumbered) in the outboard side wall 44 (FIG. 5) and is driven by a conventional right-angle drive 86 of an electric motor 87 which is controlled in direction of rotation and speed of rotation by the microcontroller Mc or one of several conventional manually operated adjustable electric switches, such as a switch 89 (FIG. 1) fixed to the wall 93 of the trough 40. As the speed of rotation of the rotatable vane feeder 80 is increased, more latex L is fed through the transverse opening 60, irrespective of the size thereof, while a decrease in rotational speed of the rotatable vane feeder 80 effects the opposite result.

As the latex L descends vertically downwardly under the influence of gravity through the transverse opening 60, it passes through and is guided by guide means 100 in the form of a rubber guide chute or sleeve having a generally rectangular cross-sectional configuration, as viewed from above and below, and terminates in a lower polygonal terminal edge portion 101 spaced the height H (FIG. 12) above the upper surface Us of the polyester fiber layer 1. The height H represents the maximum height of the latex L that will under any circumstances be deposited atop the upper surface Us of the layer L1.

Spacer means 110 (FIG. 8) and latex feed proportioning means 120 (FIG. 9) are each carried by the lower terminal edge portion 101 of the guide chute or sleeve 100.

The latex feed proportioning means 120 is a feed gate or feed plate of a generally rectangular configuration having an upper flange 121 of a polygonal configuration whose internal size matches the exterior size of the terminal end portion 101 of the guide chute 100. Thus, the terminal end portion 101 of the guide chute 100 can be slipped into the upper flange 121 of the proportional feed gate 120 and secured thereto by fasteners, such as screws or clips 122 (FIGS. 12 and 13) passed through openings 119 of the upper flange 121. A plurality of like sized generally rectangular identically spaced proportioning openings 123 are formed in the proportioning plate 120 and it is through the proportioning openings 123 that the latex L passes before being deposited upon the upper surface Us of the layer L1. Since the openings 123 are substantially equally spaced and identically sized, they assure that no matter the existence of any inconsistencies in content or volume of the latex L falling through or accumulating in the chute 100, substantially equal amounts of latex L will fall through each opening 123 to create a substantially uniform and consistent height H. Different openings 123' (FIG. 10) and 123' (FIG. 11) of respective proportional feed plates 120', 120" afford effective dispensing of latex L dependent upon differences in relative sizes of the pieces of latex L, the height H which must be achieved, the speed of production, etc. In other words, if the pieces of latex L are of one size or a specific size range, the proportional feed gate 120 might be utilized to obtain a desired height H, whereas should the pieces of latex L be of a different size, range of sizes or consistency, the proportioning plate 120' or the proportioning plate 120' might be instead utilized. However, no matter the particular proportioning plate 120, 120' or 120" which is secured to the terminal edge portion 101 of the guide chute or sleeve 100, the selection thereof will assure the exact height H and consistency of the latex pieces L deposited upon the polyester fiber layer L1 under all manufacturing protocols, such as the speed of rotation of the laminate roll Lr, the speed of rotation of the vane feeder 81, the size of the transverse opening 60, etc.

The spacing means 110 is a spacer assembly defined by a polygonal frame 111 having a plurality of openings 112 therein matching the location of the openings 119, 119', 119" of the proportional feed plates 120, 120', 120". The internal size of the frame 111 of the spacer assembly 110 substantially matches the external size and configuration of the flanges 121, 121', 121" of the respective proportional feed plates 120, 120' and 120". The frame 111 can be telescoped upon and secured to the flanges 121, 121', 121" and/or the terminal edge portion 101 of the chute 100 by utilizing conventional fasteners, such as the fasteners 122 (FIGS. 12 and 13). Projecting downwardly from the frame 111 in a convex fashion are three relatively narrow spacer rods 125 which are parallel to the direction of travel P1 and which contact the upper surface Us of the layer L1 (FIG. 12) maintaining it at all times spaced the distance H, thus assuring no matter the vertical deflection or flexing of the layer L1 during its movement, the height H of the latex L deposited upon the upper surface Us will never be less than the height H. Though not illustrated, spacer assemblies corresponding to the spacer assembly 110 can be provided as substitutes therefor with the curvature or the spacer bars 125 being lesser or greater than that shown to respectively decrease and increase the height H to achieve lesser or greater height H than that illustrated in FIG. 12. In lieu of additional spacing means, the spacing means 110 may be modified in the manner illustrated in phantom outline (dashed lines) in FIG. 8 which illustrates an increase in the overall height of the frame 111 with additional openings 112 being also shown in phantom outline in vertical spaced relationship to each other. There are three such vertical spaced openings shown in the frame 111, and depending upon which of these are utilized to fasten the frame 111 to the lower edge portion 101 of the chute 100, the distance of the spacer bars 125 from the upper surface Us of the polyester fiber layer L1 can be variably adjusted to occupy any one of three positions thus assuring three different distances for the height H of the latex L deposited upon the upper surface Us of the polyester fiber layer L1.

The means or mechanisms 15 (FIG. 1) for edge-binding/edge-bonding the layers L1, L2 to each other, along with the foam latex pieces L sandwiched therebetween, are a pair of conventional spray nozzles 130 connected by a flexible tube or conduit 131 and a conventional adjustable valve 132 to an adhesive-containing reservoir 133. The adhesive (not shown) within the reservoir 133 is nontoxic, extremely quick drying, and is preferably controlled in its application through suitably adjustably controlling the valve 132 through the microcontroller Mc in a conventional manner. The spray S emitted from the spray nozzles 130 are applied to the opposite longitudinal edges (unnumbered) of the layers L1, L2 and any of the latex particles L exposed therebetween, as is evident from FIG. 1 of the drawings. The adhesive will bind all of the exposed latex particles L to each other and to the longitudinal edges of the layers L1, L2, through preferably prior to the adhesive drying, the layers L1, L2 and L pass through the rollers 17, 18 of the roller compression mechanism or means 16 which are preferably spring-biased toward each other in a conventional manner or through pneumatic fluid cylinders (not shown) to apply desired pressure to the longitudinal edges substantially closing the same incident to the adhesive drying such that the latex L is essentially unexposed after passing beyond the rollers 17, 18.

The microcontroller Mc controls the flying cutter or flying shear 22 to transversely cut the completed laminate Lm after the laminate roll Lr has been formed to a desired length (diameter) followed by wrapping the same in the packaging material P for shipment to a subsequent user, such as a mattress manufacturer.

The laminate roll Lr is preferably driven by a right-angled drive 140 selectively driven by an electric motor 141 controlled manually by an adjustable rheostat 142 or through the microcontroller Mc. Like conventional control means 143 (FIG. 1) can be manually adjusted to vary the braking of the roll R1 through the conventional brake 32 or in lieu thereof, the brake 32 can also be controlled by the microcontroller or microprocessor Mc.

In lieu of the edge-binding/edge-bonding means 15, the utilization of conventional stitching heads (not shown) may be provided to sew the longitudinal edges of layers L1, L2 to each other during the performance of the lamination process/method.

A walkway W (FIG. 1) preferably traverses the paths of travel P1, P2 between the latex depositing mechanism 13 and the support means 12 for the roll R2 of polyester fiber material M2 or the equivalent. The walkway W serves as a substantially central area or location at which an operator can view the entire laminating machine 10 and the various components thereof to operate any of the switches or adjusting means 89, 142, 143 or the microcontroller Mc, as well as the hand wheel 94 which, though manually rotated, can as well be power driven in a conventional manner under the control of the microprocessor or microcontroller Mc. However, whether under a program control from a personal computer (PC) associated with the microcontroller Mc (FIG. 1) or manually, the amount of the latex L deposited upon the layer L1 of polyester fiber material can be varied to in turn vary the height H and/or the consistency through a variety of adjustments, as, for example:

(1) The driving means 20 can be increased or decreased to respectively speed up or reduce the speed of the layer L2 which, with all other factors remaining the same, will respectively decrease and increase the height H of the latex L.

(2) Obviously, by increasing or decreasing the speed of the motor 87 (FIG. 5) the rotation of the vane feeder 81 (FIG. 2) can be varied to again regulate the height H (FIG. 12) of the latex material L.

(3) Manipulating the pivotable trough plate 72 (FIG. 2) to vary the size of the slot 60 will also selectively vary the height H of the latex L1 deposited upon the layer L1 (FIG. 12).

(4) Alternating the particular proportioning plate 120, 120' and 120" and/or the spacer assembly 110 or its vertical height relative to the chute 100 via the vertically offset openings 112 can also be utilized to selectively vary the height H of the latex L deposited upon the layer L1.

Virtually any combination of adjustments (1) through (4) above can be utilized to vary the final end product of the laminate Lm.

Figure 15:
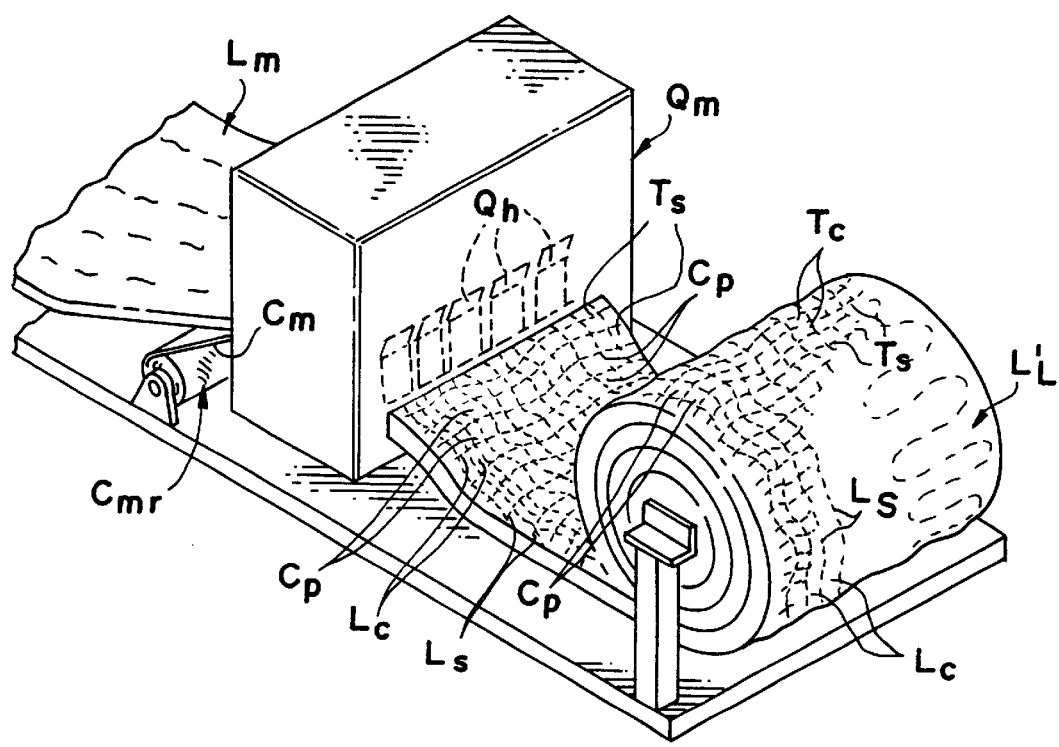
FIG. 15, which appears on the sheet of drawing containing

A modification of the laminating machine 10 of FIG. 1 is shown in FIG. 15 to which attention is now directed, and in this case the modified laminating machine is designated by the reference character 10' and includes all of the components of the laminating machine 10 except for the flying shear or flying cutter 22, and in lieu thereof is substituted a conventional quilting machine Qm having a multiplicity of conventional quilting heads (Qh) which stitch the laminate Lm immediately upon passing beyond the rollers 17, 18 of the compressing means 16 and prior to being formed into a roll L'r. The laminate roll L'r is generally fed simultaneously through the quilting machine Qm upon a web of underlying cloth material Cm drawn from an associated cloth material roll Cmr. The individual stitching or quilting heads Qh of the quilting machine Qm can be variably adjusted in a conventional manner for quilting any one of numerous different stitching patterns or quilting patterns upon the laminate L'm. However, in keeping with the present invention, the laminate or laminate material L'm is shown being stitched therethrough with substantially parallel sinusoidal longitudinal stitching Ls and substantially sinusoidal parallel transverse stitching Ts with the stitching Ls and Ts forming individual narrow sinusoidal longitudinal channels Lc and Tc, respectively, therebetween. At the crossings of the stitching Ls and Ts are formed individual substantially closed pockets Cp with each substantially closed pocket Cp being bounded by portions of two of the longitudinal lines of stitching Ls and portions of two of the transverse lines of stitching Ts. The latter described stitch crossings not only define the substantially closed pockets Cp, but the stitching and closed pockets Cp prevent excessive movement or "migration" of the latex L from each of the pockets Cp which is highly desirable when the laminate material L'm is made into a mattress, for example. When, for example, a portion of the laminate L'm is formed as an upper layer of a mattress and a person lies and moves thereupon for days, months or years at a time, the latex L will not migrate but instead will remain in each of the substantially closed pockets Cp and the uniformity and consistency of the mattress thus manufactured will be maintained substantially for its entire lifetime.

While the closed pockets Cp are a preferable form of the stitching, migration of the latex L of the laminate L'm is substantially lessened even absent such "closed" pockets. For example, if the transverse stitching Ts were eliminated, the very nature of the narrowness and the sinusoidal curvature of the longitudinal channels Lc would materially preclude migration in the longitudinal direction and would, of course, totally preclude migration in the transverse direction. Obviously, the opposite is true, namely, if the longitudinal stitching Ls were eliminated, the sinusoidal curvature and the narrowness of the transverse channels Tc would substantially lessen migration of the latex L in the transverse direction and, of course, the transverse stitching Tc would totally preclude migration of the latex L in the longitudinal direction. Therefore, the stitching of the laminate L'm need only be such as to define an overall pattern which would substantially lessen or preclude migration of the latex L between the layers L1, L2, irrespective of the "closed" or "open" nature thereof, through substantially "closed" pockets Cp and equivalents thereof are preferred.

In further accordance with the present invention, the machine 10, through described with respect to utilizing polyester fiber material M1, M2 in association with the respective rolls R1, R2, can be varied in operation by utilizing other materials, and one particular modification is illustrated in FIGS. 13 and 14 of the drawings wherein the roll R2 of polyester fiber material M2 of FIG. 1 has been eliminated and substituted therefor is a roll R'2 of conventional convoluted foam latex material M'2 defined by a relatively flat inner/upper surface S'u and a convoluted outer lower surface S'1, the latter being defined by a plurality of downwardly/outwardly projecting peaks P' and outwardly/downwardly opening valleys V'. Latex particles L', corresponding to the latex particles L of FIG. 1, are deposited upon an upper surface U's of a lower layer or web L'1 of polyester fiber material M'1 upon which is superimposed a layer or web L'2 drawn from the roll R'2 resulting in the valleys V' being substantially filled with the pieces of latex L'. Thus, as is best illustrated in FIG. 14, each of the valleys V' defines a substantially closed pocket C'p substantially entirely filled by the latex L' thereby assuring the absence of migration thereof, just as in the case of the pockets Cp of FIG. 15, but absent the quilting thereof. However, the eventually formed laminate L'm can be stitched utilizing the conventional quilting machine Qm of FIG. 15, but the quilting need not be specifically utilized to achieve nonmigration of the latex L'.

Although a preferred embodiment of the invention has been specifically illustrated and described herein, it is to be understood that minor variations may be made in the apparatus without departing from the spirit and scope of the invention, as defined the appended claims.

What is claimed is:

1. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, edge-binding longitudinal edges of the laminate, and performing the edge-binding step by applying an adhesive to a longitudinal edge of at least one of the first and second indeterminate lengths of material.

2. The laminate method as defined in claim 1 including the step of stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

3. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, edge-binding longitudinal edges of the laminate, and performing said edge-binding step by spraying an adhesive to a longitudinal edge of at least one of the first and second indeterminate lengths of material.

4. The laminate method as defined in claim 3 including the step of stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

5. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, and stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

6. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, creating a plurality of downwardly opening valleys in a lower surface of the other of the first and second indeterminate lengths of material which substantially house the pieces of latex foam therein incident to performing the sandwiching step.

7. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, the depositing step is effected from a trough housing a supply of the pieces of latex foam, the trough being in substantially transverse spanning relationship to the feeding direction of the first material, the trough includes openings through which pass the pieces of latex foam incident to the performance of the depositing step, and removing the trough openings and replacing the trough openings with different trough openings to thereby selectively vary the deposition of the pieces of latex foam upon the first material.

8. The laminate method as defined in claim 7 including the step of stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

9. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, rolling the laminate into a roll, the depositing step is effected from a trough housing a supply of the pieces of latex foam, the trough being in substantially transverse spanning relationship to the feeding direction of the first material, the trough includes opening through which pass the pieces of latex foam incident to the performance of the depositing step, selectively varying the size of the trough opening, the trough opening being a slot extending substantially along the length of said trough, and selectively adjusting the transverse dimension of the slot to thereby regulate the deposition of the pieces of latex foam upon the first material.

10. The laminate method as defined in claim 9 including the step of stitching a plurality of substantially peripherally-closed anti-migration pockets solely by a plurality of stitches passing through, between and stitching together the first and second materials within which pockets substantially all of the pieces of latex foam are substantially freely movable while at the same time are substantially captively confined.

11. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes an upper surface of one of the first and second indeterminate lengths of material during the feeding thereof between the respective sources and the assembly area, sandwiching the pieces of latex foam between the indeterminate lengths of first and second materials to form a laminate therefrom, quilting the laminate, and stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

12. A method of manufacturing a laminate particularly adapted for bedding, padding and upholstering comprising the steps of feeding an indeterminate length of first material having opposite surfaces along a predetermined first path of travel from a source of the first material to a downstream assembly area, feeding an indeterminate length of second material having opposite surfaces along a predetermined second path of travel from a source of the second material to the assembly area, depositing pieces of latex foam of random sizes upon an upper surface of one of the first and second indeterminate length material during the feeding thereof between the respective sources and the assembly area prior to sandwiching the pieces of latex foam between the upper surface of the one material and a lower surface of another of the first and second indeterminate length materials, at least one of the upper and lower surfaces being a convoluted surface defined by peaks and valleys, and sandwiching the pieces of latex foam between the indeterminate lengths of first and second materials to form a laminate therefrom and during the sandwiching of the first and second materials confining the pieces of latex foam in the valleys.

13. The laminating method as defined in claim 12 wherein the indeterminate length material having the convoluted surface is latex.

14. The laminating method as defined in claim 12 wherein the convoluted surface is the lower surface.

15. The laminating method as defined in claim 12 wherein the convoluted surface is the upper surface.

16. The laminating method as defined in claim 12 wherein the convoluted surface is the lower surface of an uppermost of the first and second indeterminate length materials.

17. The laminating method as defined in claim 16 wherein the indeterminate length material having the convoluted surface is latex.

18. The laminating method as defined in claim 12 wherein the convoluted surface is the upper surface of a lowermost of the first and second indeterminate length materials.

19. The laminating method as defined in claim 12 wherein the convoluted surface is the lower surface of an uppermost of the first and second indeterminate length materials, and the upper surface is a substantially planar surface of a lowermost of the first and second indeterminate length materials.

20. The laminating method as defined in claim 12 wherein the convoluted surface is the upper surface of a lowermost of the first and second indeterminate length materials, and the lower surface is a substantially planar surface of an uppermost of the first and second indeterminate length materials.

21. The laminating method as defined in claim 20 wherein the indeterminate length material having the convoluted surface is latex, and the cushioning materials are latex.

22. The laminating method as defined in claim 12 wherein the convoluted surface is the lower surface of an uppermost of the first and second indeterminate length materials, the upper surface is a substantially planar surface of a lowermost of the first and second indeterminate length materials, and crest portions of the peaks contact the planar surface.

23. The laminating method as defined in claim 22 wherein the indeterminate length material having the convoluted surface is latex.

24. The laminating method as defined in claim 12 wherein the convoluted surface is the upper surface of a lowermost of the first and second indeterminate length materials, the lower surface is a substantially planar surface of an uppermost of the first and second indeterminate length materials, and crest portions of the peaks contact the planar surface.

25. The laminating method as defined in claim 12 wherein the volume of pieces of latex foam deposited upon the upper surface is substantially confined in the valleys.

26. The laminating method as defined in claim 12 including the step of edge-binding longitudinal edges of the laminate.

27. The laminating method as defined in claim 12 including the step of edge-bonding longitudinal edges of the laminate.

28. The laminating method as defined in claim 12 including the step of rolling the laminate into a roll.

29. A method of manufacturing a laminate particularly adapted for bedding, padding and upholstering comprising the steps of feeding an indeterminate length of first material having opposite surfaces along a predetermined first path of travel from a source of the first material to a downstream assembly area, feeding an indeterminate length of second material having opposite surfaces along a predetermined second path of travel from a source of the second material to the assembly area, depositing pieces of latex foam of random sizes upon an upper surface of one of the first and second indeterminate length materials during the feeding thereof between the respective sources and the assembly area prior to sandwiching the pieces of latex foam between the upper surface of the one material and a lower surface of another of the first and second indeterminate length materials, the volume of pieces of latex foam deposited upon the upper surface is substantially in the range of 0.15–0.50 pound per square yard, and one of the indeterminate length materials is latex and another of the indeterminate length materials is polyester fiber.

30. A method of manufacturing a laminate particularly adapted for bedding, padding and upholstering comprising the steps of feeding an indeterminate length of first material having opposite surfaces along a predetermined first path of travel from a source of the first material to a downstream assembly area, feeding an indeterminate length of second material having opposite surfaces along a predetermined second path of travel from a source of the second material to the assembly area, depositing pieces of latex foam of random sizes upon an upper surface of one of the first and second indeterminate length materials during the feeding thereof between the respective sources and the assembly area prior to sandwiching the pieces of latex foam between the upper surface of the one material and a lower surface of another of the first and second indeterminate length materials, the volume of pieces of latex foam deposited upon the upper surface is substantially in the range of 0.15–0.50 pound per square yard, one of the indeterminate length materials is latex and another of the indeterminate length materials is polyester fiber, the one indeterminate length material includes a convoluted surface defined by peaks and valleys, and the pieces of latex foam are housed in the valleys.

31. A method of manufacturing a laminate particularly adapted for bedding, padding and upholstering comprising the steps of feeding an indeterminate length of first material having opposite surfaces along a predetermined first path of travel from a source of the first material to a downstream assembly area, feeding an indeterminate length of second material having opposite surfaces along a predetermined second path of travel from a source of the second material to the assembly area, depositing pieces of latex foam of random sizes upon an upper surface of one of the first and second indeterminate length materials during the feeding thereof between the respective sources and the assembly area prior to sandwiching the pieces of latex foam between the upper surface of the one material and a lower surface of another of the first and second indeterminate length materials, and stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

32. The laminating method as defined in claim 31 wherein the stitched anti-migratory areas are substantially pockets.

33. The laminating method as defined in claim 31 wherein the stitched anti-migratory areas are substantially closed pockets.

34. The laminating method as defined in claim 31 wherein the stitched anti-migratory areas are substantially narrow channels.

35. The laminating method as defined in claim 31 wherein the stitched anti-migratory areas are substantially narrow crossing channels.

36. The laminating method as defined in claim 31 wherein the stitched anti-migratory areas are substantially narrow sinusoidal channels.

37. A method of manufacturing a laminate particularly adapted for bedding, padding and upholstering comprising the steps of feeding an indeterminate length of a first material along a predetermined first path of travel from a source of the first material to a downstream assembly area, feeding an indeterminate length of second material along a predetermined second path of travel from a source of the second material to the downstream assembly area, depositing pieces of latex foam of random sizes upon an upper surface of one of the first and second indeterminate lengths of material during the feeding thereof between the respective sources and the assembly area, sandwiching the pieces of latex foam between the indeterminate lengths of first and second materials to form a laminate therefrom, and stitching a plurality of substantially peripherally closed anti-migration pockets solely by a plurality of stitches passing through, between and stitching together the first and second materials within which pockets substantially all of the pieces of latex foam are substantially freely movable while at the same time are substantially captively confined.

38. The method as defined in claim 37 including the steps of edge-binding longitudinal edges of the laminate.

39. The method as defined in claim 37 including the steps of edge-bonding longitudinal edges of the laminate.

40. The method as defined in claim 37 including the step of selectively varying the speed of the first material during the feeding thereof along the first path of travel.

41. The method as defined in claim 37 including the step of varying the depositing of the pieces of latex foam.

42. The method as defined in claim 37 including the step of varying the depositing of the pieces of latex foam in correlation with the variation in speed of the fire material.

43. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, means for edge-binding longitudinal edges of the laminate, and said edge-binding means includes means for applying an adhesive to a longitudinal edge of at least one of the first and second indeterminate lengths of material.

44. The laminate manufacturing machine as defined in claim 43 including means for compressing the laminate longitudinal edges.

45. The machine as defined in claim 43 wherein the edge-bonding means includes means for compressing the laminate.

46. The machine as defined in claim 43 wherein the edge-bonding means includes means for compressing the laminate edges.

47. The machine as defined in claim 43 wherein the edge-bonding means includes means for compressing the laminate edges upstream of said rolling means.

48. The laminate manufacturing machine as defined in claim 43 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

49. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, means for edge-binding longitudinal edges of the laminate, and said edge-binding means includes means for spraying an adhesive to a longitudinal edge of at least one of the first and second indeterminate lengths of material.

50. The laminate manufacturing machine as defined in claim 49 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

51. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which substantially all pieces of foam latex are substantially free to move.

52. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, the depositing means including trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, and means for selectively adjusting the transverse dimension of said slot to thereby regulate the deposition of the pieces of latex foam upon the first material.

53. The laminate manufacturing machine as defined in claim 52 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

54. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll the depositing means including trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, said slot being defined in part by a movable trough plate having a lower edge in part defining said slot, and said adjusting means includes means for moving said trough plate and its lower edge to thereby adjust the transverse dimension of said slot.

55. The laminate manufacturing machine as defined in claim 54 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

56. A machine for manufacturing a laminate particularly adapted for bedding, padding, and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, the depositing means including trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, said slot being defined in part by a pivotable trough plate having a lower edge in part defining said slot, and said adjusting means includes means for pivoting said trough plate and its lower edge to thereby adjust the transverse dimension of said slot.

57. The laminate manufacturing machine as defined in claim 56 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

58. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, the depositing means including trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, and rotatable feed means for regulating the passage of the pieces of latex foam through the slot.

59. The laminate manufacturing machine as defined in claim 58 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

60. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area means for sandwiching the pieces of foam latex between the indeterminate lengths of first and second materials to form a laminate therefrom, means for rolling the laminate into a roll, the depositing means including trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, said slot being defined in part by a pivotable trough plate having a lower edge in part defining said slot, said adjusting means includes means for pivoting said trough plate and its lower edge to thereby adjust the transverse dimension of said slot, and rotatable feed means for regulating the passage of the pieces of latex foam through the slot.

61. The laminate manufacturing machine as defined in claim 60 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-migration areas within which all pieces of foam are substantially confined yet are substantially free to move.

62. A machine for manufacturing a laminate particularly adapted for bedding, padding and upholstering comprising first means for feeding an indeterminate length of a first material along a predetermined first path of travel from a source of the first material to a downstream assembly area second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, the depositing means includes a trough disposed in substantially transverse spanning relationship to the feeding direction of the first material, opening means along a bottom of said trough through which pass the pieces of latex foam incident to the depositing thereof upon the first material, a chute substantially surrounding said opening means and extending downwardly toward the first material, a lower terminal edge of said chute being spaced slightly above the first material, and means for maintaining a space between said chute terminal edge and the first material.

63. The laminate manufacturing machine as defined in claim 62 including stitching means for solely forming a plurality of substantially peripherally closed anti-migration areas for substantially captively housing the pieces of latex foam between the first and second materials, and said stitching means are a plurality of stitches passing through and stitching together the first and second materials into said substantially peripherally closed anti-nonmigration areas within which all pieces of foam are substantially confined yet are substantially free to move.

64. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, means for edge-binding longitudinal edges of the laminate, and the depositing means includes trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, said slot being defined in part by a movable trough plate having a lower edge in part defining said slot, and said adjusting means includes means for moving said trough plate and its lower edge to thereby adjust the transverse dimension of said slot.

65. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, means for edge-binding longitudinal edges of the laminate, and the depositing means includes trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, said slot being defined in part by a pivotable trough plate having a lower edge in part defining said slot, and said adjusting means includes means for pivoting said trough plate and its lower edge to thereby adjust the transverse dimension of said slot.

66. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, means for rolling the laminate into a roll, means for edge-binding longitudinal edges of the laminate, and the depositing means includes trough means for housing a supply of the pieces of latex foam, said trough means being in substantially transverse spanning relationship to the feeding direction of the first material, opening means along said trough means through which pass the pieces of latex foam incident to the depositing thereof upon the first material, said opening means being a slot extending substantially along the length of said trough means, means for selectively adjusting the transverse dimension of said slot to thereby regulate the deposition of the pieces of latex foam upon the first material, and rotatable feed means for regulating the passage of the pieces of latex foam through the slot.

67. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, the depositing means including trough means for housing a supply of the pieces of latex foam; said trough means being in substantially transverse spanning relationship to the feeding direction of the first material and above the first material during the feeding thereof; opening means along said trough means through which pass the pieces of latex foam incident to the gravity depositing thereof upon the first material, said opening means being a slot extending substantially along the length of said trough means, means for selectively adjusting the transverse dimension of said slot to thereby regulate the deposition of the pieces of latex foam upon the first material, and means for imparting motion to the pieces of latex foam to augment the gravity deposition thereof upon the first material.

68. The machine as defined in claim 67 including means for rolling the laminate into a roll, and means for drivingly rotating said laminate rolling means to thereby automatically draw the first and second materials toward the assembly area.

69. The machine as defined in claim 68 including means for selectively controlling the drivingly rotating means and the, latex foam pieces motion imparting means to achieve a desired height of deposit of the latex foam pieces upon the first material.

70. The machine as defined in claim 68 including means for selectively varying the speed of said drive means.

71. A machine for manufacturing a laminate particularly adapted for bedding, padding and upholstering comprising first means for feeding an indeterminate length of a first material along a predetermined first path of travel from a source of the first material to a downstream assembly area, second means for feeding an indeterminate length of second material along a predetermined second path of travel from a source of the second material to the downstream assembly area, means for depositing a multiplicity of pieces of foam latex of random sizes upon an upper surface of one of the first and second indeterminate lengths of material during the feeding thereof between the respective sources and the assembly area, means for sandwiching the pieces of foam latex between the indeterminate lengths of first and second materials to form a laminate therefrom, the depositing mans including opening means through which pass the pieces of latex foam incident to the depositing thereof upon the first material, said opening means being in substantially transverse spanning relationship to the feeding direction of the first material, and said opening means including at least a first opening of a first size differing from a second opening of a second size whereby at least two different zones of the foam latex pieces are deposited upon the first material.

72. The machine for manufacturing a laminate as defined in claim 71 wherein a plurality of said first openings are disposed transversely along and adjacent a first longitudinal edge of the first material, and a plurality of said second openings are disposed transversely along and adjacent a second longitudinal edge of the first material.

73. The machine for manufacturing a laminate as defined in claim 71 wherein a plurality of said first and second openings are disposed transversely along and adjacent first and second opposite longitudinal edges of the first material.

74. The machine for manufacturing a laminate as defined in claim 71 wherein a plurality of said first and second openings are disposed transversely substantially entirely across the first material.

\* \* \* \* \*